UNITED STATES PATENT OFFICE.

CARLETON B. HUTCHINS, OF ANN ARBOR, MICHIGAN.

IMPROVED COMPOSITION FOR ARTIFICIAL STONE.

Specification forming part of Letters Patent No. 88,877, dated April 13, 1869.

*To all whom it may concern:*

Be it known that I, CARLETON B. HUTCHINS, of Ann Arbor, in the county of Washtenaw, in the State of Michigan, have invented a new and Improved Water-Proof Artificial Rock, to be used for tunneling and arching purposes, in all forms and places, and for paving of streets, building of abutments, piers, and columns; and I hereby declare that the following is a full and exact description thereof.

The nature of my invention consists in the compounding of ingredients to make a water-proof artificial rock.

To enable others skilled in the art to make and use my invention, I will proceed to describe the compounding of the same.

I take one and a quarter pound of rosin; three pounds of clean coarse gravel; one pound of clean sharp sand; one pound of slate or stone, ground, of any kind which is free from oils; two ounces of linseed or cotton-seed oil.

I heat the gravel, sand, and stone. I then place all the ingredients into a kettle and heat slowly, and when sufficiently melted I continue to stir it until well mixed. I am careful not to heat the composition hot enough to injure the oil. I increase the oil when I wish to make it thin, and increase or diminish either of the ingredients, to suit the structure I wish to build. Molds, of wood or sand, will have to be used in confining this composition until it becomes hard.

To construct pavements I have the road-bed properly prepared. I then lay on two or three thicknesses of felt-paper. I cover the paper from one to two inches thick with the composition. I then place down blocks of suitable length, and far enough apart to admit the composition to run around them, which I turn onto the top until the crevices are all full.

The blocks can be left out, and make the structure thick enough to hold with the composition.

In preparing the composition to be used without the blocks I use much coarser gravel.

What I claim as my invention, and desire to secure by Letters Patent, is—

The compounding of ingredients before named to make a water-proof rock, to be used in the various arts before named.

March 27, 1869.

CARLETON B. HUTCHINS.

Witnesses:
 CHARLES F. BROWN,
 F. FARQUHAR.